United States Patent [19]

Shibayama et al.

[11] Patent Number: 5,075,707
[45] Date of Patent: Dec. 24, 1991

[54] CAMERA

[75] Inventors: Yoshinobu Shibayama, Kanagawa; Toyotoshi Suzuki, Tokyo, both of Japan

[73] Assignee: Canon Kabushiki Kaisha, Tokyo, Japan

[21] Appl. No.: 707,938

[22] Filed: May 28, 1991

Related U.S. Application Data

[63] Continuation of Ser. No. 551,641, Jul. 12, 1990, abandoned, which is a continuation of Ser. No. 165,000, Mar. 7, 1988, abandoned.

[30] Foreign Application Priority Data

Mar. 11, 1987 [JP] Japan ................................ 62-055591
Mar. 11, 1987 [JP] Japan ................................ 62-055592

[51] Int. Cl.⁵ ............................................... G03B 1/12
[52] U.S. Cl. ................................................ 354/173.1
[58] Field of Search .................... 354/173.1, 173.11

[56] References Cited

U.S. PATENT DOCUMENTS 3,448,668  6/1969  Nomura et al. .................. 354/173.1
4,720,719  1/1988  Hamada et al. .................. 354/173.1

FOREIGN PATENT DOCUMENTS 55-143550  11/1950  Japan .
57-201221  12/1982  Japan .

Primary Examiner—Michael L. Gellner

[57] ABSTRACT

In a camera in which a film cartridge is loaded into the camera while a leader of film projecting out of the film cartridge is left outside the camera, and, after the leader of film projecting out of the film cartridge is pulled in the camera, the film is fed to a film take-up spool, there are provided a film cartridge chamber arranged to protrude toward the front of the camera such that a film advance path is bent at a position between the film cartridge chamber and an aperture of the camera, and a film feeding action portion arranged at the bent position.

15 Claims, 6 Drawing Sheets

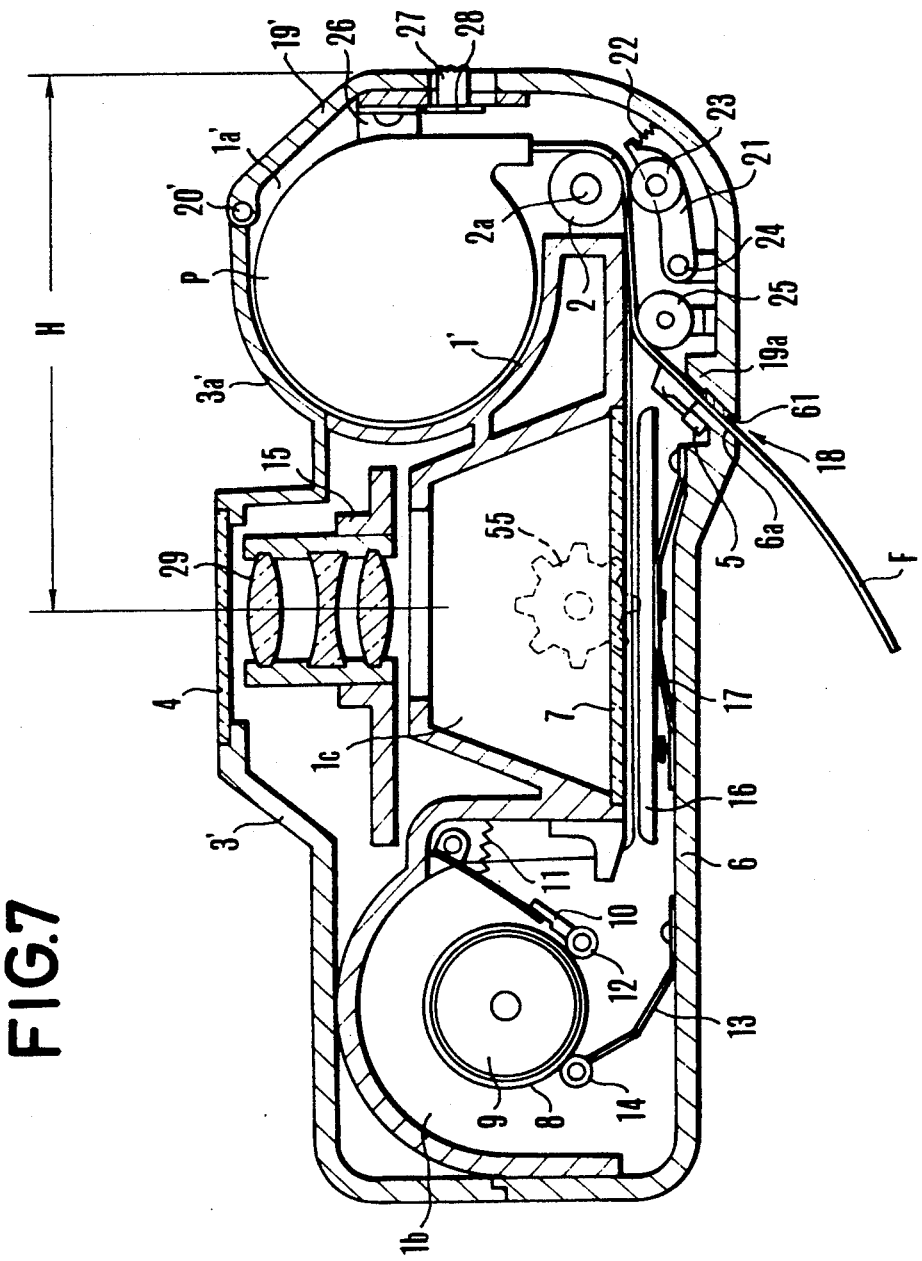

CAMERA

This application is a continuation of application Ser. No. 07/551,641 filed July 12, 1990, which is a continuation of application Ser. No. 07/165,000 filed March 7, 1988, both applications now abandoned.

BACKGROUND OF THE INVENTION

1. Field of the Invention

This invention relates to cameras of the simplified loading type in which the film cartridge is loaded into the camera under such a condition that the film leader remains left outside the camera, and, after having pulled the film leader in, the camera winds the film onto a take-up spool, and, more particularly, to improvements in the same.

2. Description of the Related Art

In a camera using roll film, the film loading operation is considerably troublesome. Therefore, proposals have been made for a camera capable of loading film quickly and easily, or the so-called "simplified loading" type of camera.

The camera of the above-described simplified film loading type the present applicant already proposed is so constructed that all what is needed to complete the loading is only to insert the film cartridge into the film cartridge chamber and close the back cover, and, therefore, is very easy to use. Even for the camera of this previous proposal, there have been left room for improvement in the following points:

(i) Because there is need to arrange a roller for feeding film in the space between the cartridge chamber and the aperture chamber, the length of the space must be made larger than in the ordinary camera. This leads to an increase in the lateral length of the camera which in turn causes a great increase in the bulk and size of the camera.

(ii) Since the path of advance of the film from the cartridge chamber to the aperture chamber is designed to be straight and arranged in tangential relation on the outer periphery of the film feeding roller, the film comes into contact with the film feeding roller at only one point, so that there is a danger that slipping takes place between the film and the film feeding roller.

SUMMARY OF THE INVENTION

With the foregoing in mind, the present invention has been made, and its object is to provide an improved camera of the type that the film cartridge is loaded into the camera in such a condition that the film leader projecting outwardly of the cartridge remains outside the camera, and, after having pulled the above-described projecting film leader into the camera, the camera winds the film onto the take-up spool, in which the film cartridge chamber is disposed protruding toward the front of the camera such that the path of advance of the film between the cartridge chamber and the aperture chamber is bent at a bent portion and a film feeding action portion is disposed at the bent portion, thereby giving advantages that the lateral length of the camera is shorter and there is no possibility of occurrence of slipping between the film and the above-described film feeding action portion.

Other objects of the invention will become apparent from the following description of embodiments thereof.

BRIEF DESCRIPTION OF THE DRAWINGS

FIG. 7 is a transverse sectional plan view of another embodiment of the invention.

DETAILED DESCRIPTION OF THE PREFERRED EMBODIMENTS

Figure 1:
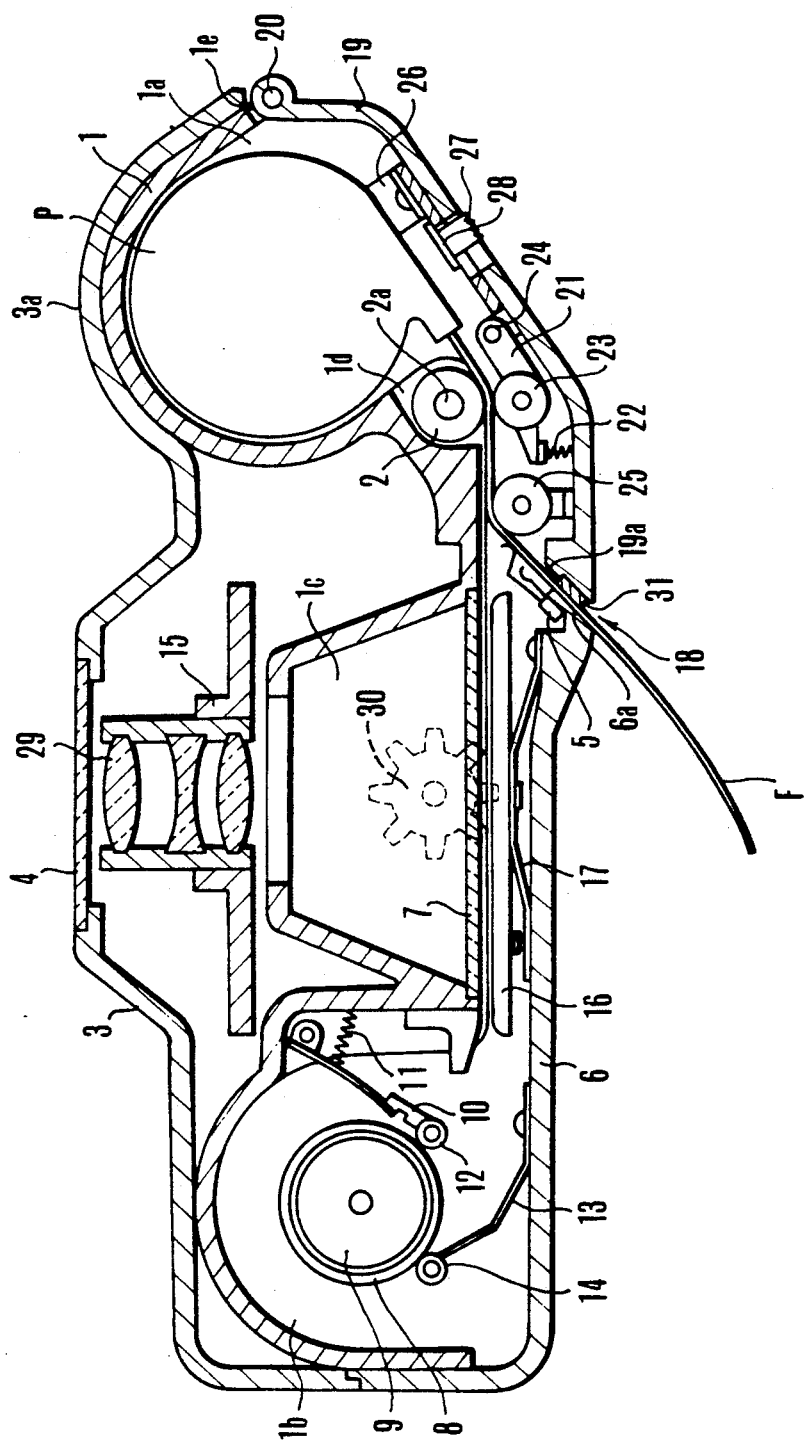
FIG. 1 transverse sectional plan view of an embodiment of a camera according to the present invention.
Figure 2:
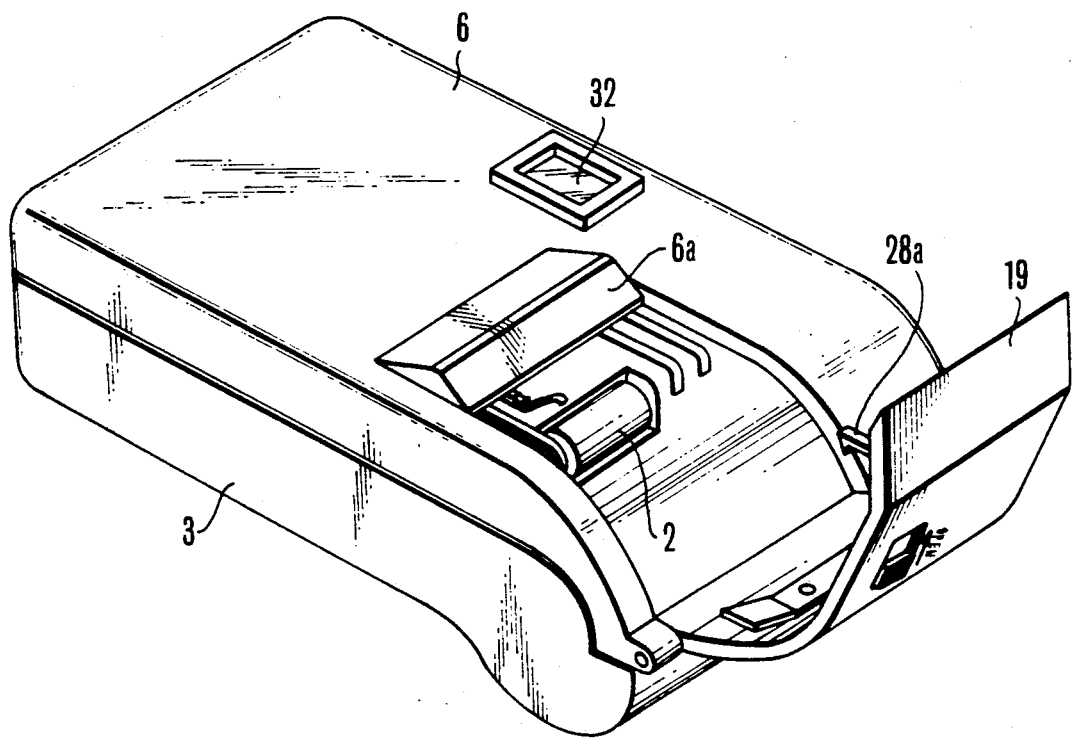
FIG. 2 is a perspective view looking from the back of the camera of FIG. 1 with the back cover opened before a film cartridge is loaded.
Figure 3:
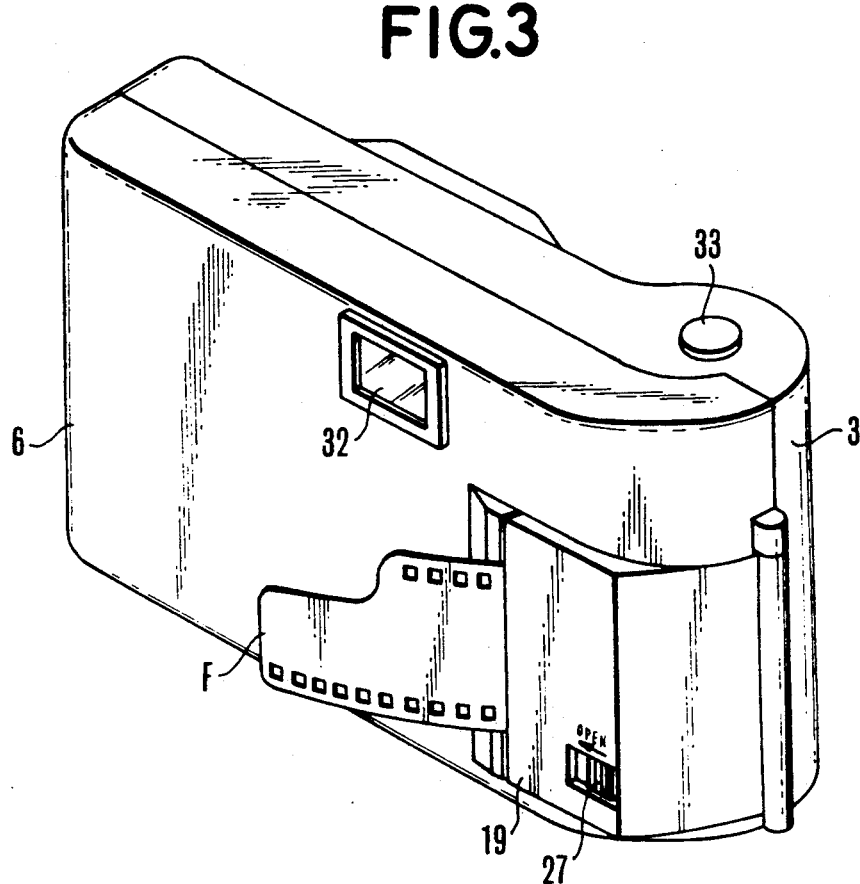
FIG. 3 is similar to FIG. 2 except that the back cover is closed after the cartridge has been loaded.
Figure 4:
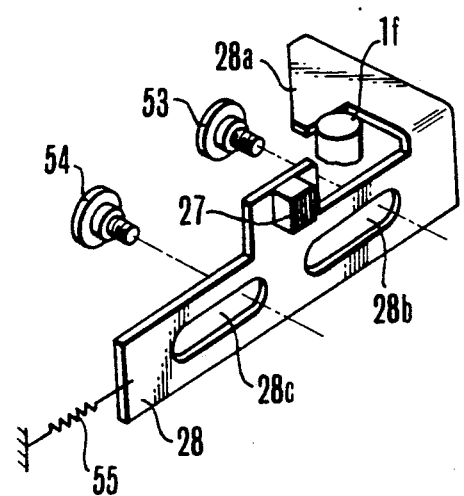
FIG. 4 is an exploded perspective view of the back cover opening and closing mechanism of the camera of FIG. 1.
Figure 5:
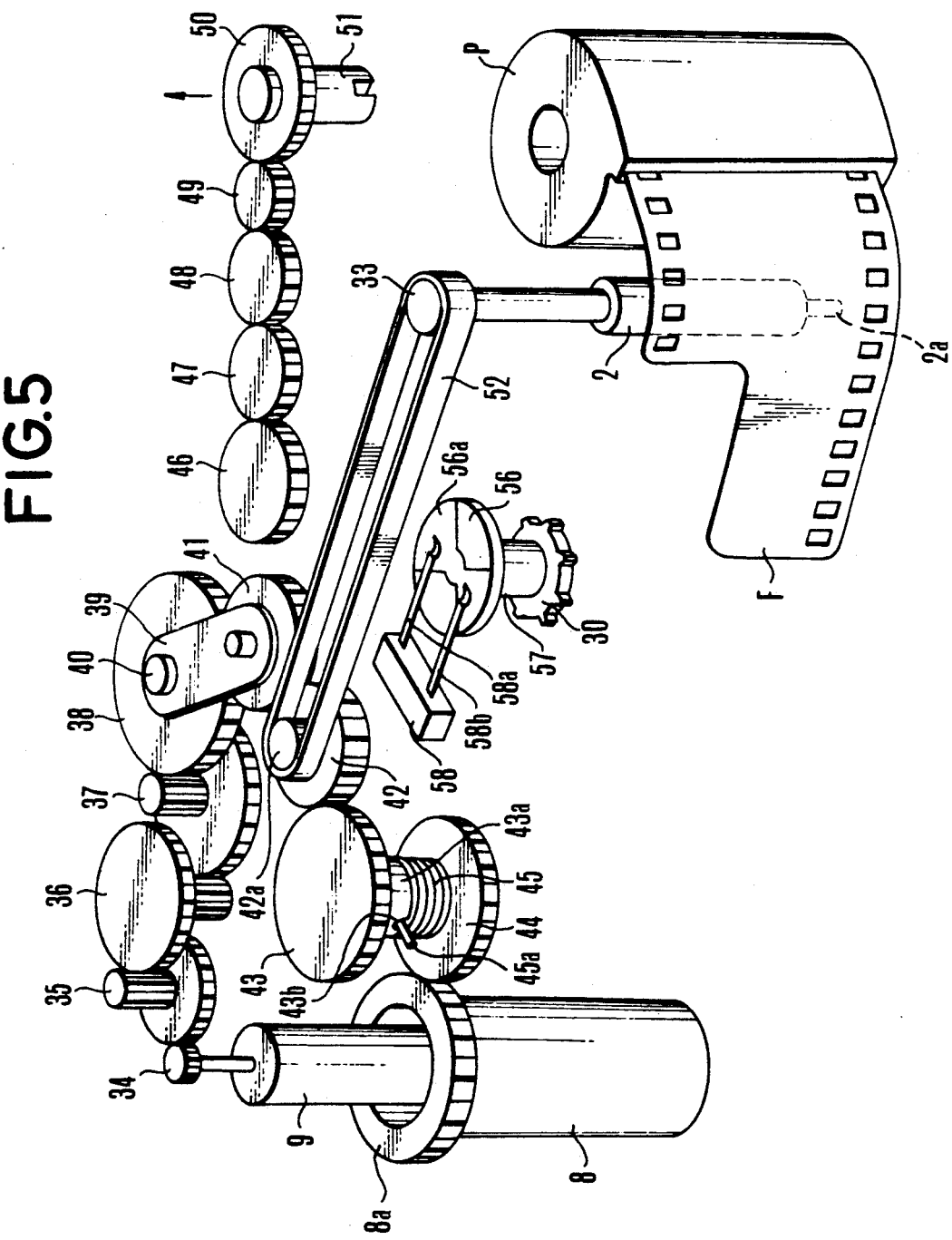
FIG. 5 is a perspective view illustrating the driving power transmission mechanism for feeding film and the fed film amount detecting means.

FIG. 1 shows a first embodiment of the improved camera according to the invention, and, in transverse sectional plan view, how a cartridge is loaded into the camera just after the back cover is closed, while in FIG. 2 the back cover is opened to show the entrance to the cartridge chamber and its neighborhood. FIG. 3 shows the film leader projecting outwardly of the camera at the time of closure of the back cover. FIG. 4 is a perspective view in enlarged scale of a back cover opening and closing mechanism of the camera. FIG. 5 is a perspective view of a film feeding mechanism.

In FIG. 1, a framework 1 of the camera is formed to accommodate a cartridge chamber 1a, a spool chamber 1b and an aperture chamber 1c. In this framework 1, differing in shape from the conventional one, the cartridge chamber 1a slightly extrudes forward out of line passing through the spool and aperture chambers 1b and 1c, and turns toward the aperture chamber 1c as shown in the figures. Therefore, the overall width of the camera is minimized. Also, an opening of the cartridge chamber 1a is made not to orient in parallel to the optical axis of the photographic lens, but to face obliquely backward.

Formed in a portion between the cartridge chamber 1a and the aperture chamber 1c is a recess 1d for accommodating a film feeding roller 2 serving as a film feeding action portion. The roller 2 is fixedly mounted on a shaft 2a which is rotatably mounted in the recess 1d. Since, in this embodiment of the camera, the cartridge chamber 1a is disposed as tilting forward, the path through which the film is to be fed from the cartridge chamber 1a to the aperture chamber 1c is bent. It is at this bent point of the path that the film feeding roller 2 is positioned, such that an outer periphery of the roller 2 conforms the bending of the film advance path. In the camera of this embodiment, therefore, the area of contact between the roller 2 and the film becomes far larger than in the camera of the above-described previous proposal by the applicant of the present invention. Thus, a very great increase of the efficiency of transmission of the driving power from the roller 2 to the film is achieved.

The obliquely backward faced opening portion of the cartridge chamber 1a is shielded by a back cover 19 of so small a size as to be able to expose only the cartridge chamber 1a and the neighborhood of the film feeding roller 2. The back cover 19 is hinged at its one end on a pivotal pin 20 which is mounted on a side edge 1e of the opening portion of the cartridge chamber 1a. Because the opening portion of the cartridge chamber 1a faces obliquely backward, that part of the back cover 19 which is to shield the cartridge chamber 1a declines obliquely sideward from a rear cover 6 of the camera. But, because that part of the back cover 19 which is to be contiguous to the rear cover 6 is parallel with the rear surface of the rear cover 6 (which surface is perpendicular to the optical axis of the photographic lens), the cross-section of the back cover 19 is of a non-linear or curved shape as shown in FIG. 1.

The rear surface of the rear cover 6 also serves as a plane perpendicular to the optical axis of the photographic lens, being joined with a front cover 3 at the side wall portion of the spool chamber 1b, and being fixedly secured to the framework 1. The rear surface of the rear cover 6 shields the spool chamber 1b and the aperture chamber 1c in the rear portion of the camera, and is fitted to the back cover 19 at the neighborhood of one of the side edge portions of the aperture chamber 1c. While the opening edge of the rear cover 6 is formed as a slant surface 6a slanting relative to the rear surface of the rear cover 6, the end surface of the free side of the back cover 19 confronting the slant surface 6a is formed as a slant surface 19a of the same inclination as that of the slant surface 6a so that when the back cover 19 is closed, a film passage slit 18 for blank rewinding is formed between the slant surfaces 6a and 19a. Also, a light blocking member 31 made of soft, shrinkable material is mounted on the slant surface 19a of the back cover 19.

A recessed portion is arranged behind the back side of the slant surface 6a of the rear cover 6. A detection switch 5 is arranged in this recessed portion to detect whether or not the film is present in the blank rewind film passage slit 18. When the film is present in the slit 18, one contact member of the detection switch 5 is pushed in engagement on the film, so that the switch 5 turns off. When the film moves away from the contact member, the switch 5 turns on.

The front cover 3 fixedly secured to the rear cover 6 and the framework 1 has a central opening in which a protection glass 4 is fitted in front of the photographic lens 29, and that portion of the front cover 3 which is positioned on the front side of the cartridge chamber 1a is formed as a curved portion 3a in conformity to the outer peripheral wall of the cartridge chamber 1a.

The photographic lens 29 arranged inside the front cover 3 is carried on a front plate unit 15 which is supported on the framework 1.

Reference numeral 8 identifies a spool for taking up the fed film provided in the spool chamber 1b. In the spool 8, there is accommodated an electric motor 9 for driving rotation of a fork and the spool 8 through a driving power transmission mechanism shown in FIG. 5.

Film leader connecting rollers 12 and 14 for bringing the film leader into connection with the outer periphery of the spool 8 are arranged in the spool chamber 1b in contact with the outer periphery of the spool 8. One of them, or the roller 12, is rotatably mounted on the free end of a roller support resilient plate 10 of which the opposite end is fixedly secured to the framework 1 by a fastener screw. A spring 11 urges the roller support plate 10 toward the outer periphery of the spool 8. The other film leader connecting roller 14 is rotatably mounted on the free end of a roller support resilient plate 13 of which the opposite end is fixedly secured to the inner surface of the rear cover 6 by a fastener screw. By the resilient force of the roller support plate 13, the roller 14 is pressed on the outer periphery of the spool 8.

On the inner surface of the back cover 19 there are provided a cartridge pressor spring 26 for restraining the cartridge P loaded in the cartridge chamber 1a from movement, a first pinch roller 23 arranged in a position opposite to the feeding roller 2 to sandwich the film F between it and the outer periphery of the feeding roller 2, a pinch roller support plate 21 on which the pinch roller 23 is rotatably supported and whose one end is pivotally mounted on the back cover 19 by a pin 24, a spring 22 connected between the other end of the pinch roller support plate 21 and the inner surface of the back cover 19 to apply pressure to the pinch roller 23 in a direction to the film surface through the pinch roller support plate 21, and a second pinch roller 25 arranged adjacent the blank rewind film passage slit 18 to press the film F on the framework 1. Also, a laterally elongated opening is provided through the wall of the back cover 19 to allow for insertion of a back cover opening-closing operation knob 27 as shown in FIGS. 1 to 3. In the position of this opening, the back cover opening-closing lever 28 shown in FIG. 4 is mounted in slidable relation to the back cover 19.

Reference numeral 7 identifies a transparent glass plate fixedly secured to an opening portion of the aperture chamber 1c to form a film advance surface and to allow for entrance of light to the film. A pressor plate 16 is arranged in parallel with the glass plate 7 to form a film advance path with the glass plate 7. A spring 17 is fixedly mounted on the inner surface of the rear cover 6 to urge the pressor plate 16 toward the glass plate 7. A sprocket 30 is rotated in engagement with the perforations of the advancing film between the cartridge and spool chambers 1a and 1b. The sprocket 30 and associated parts therewith will be described more fully later by reference to FIGS. 5 and 6.

FIGS. 2 and 3 are perspective views of the back side of the camera of this embodiment. In these figures, 32 is a finder eyepiece; and 33 is a release button.

FIG. 4 is a perspective view of the back cover opening-closing lever 28 and associated parts mounted on the inner surface of the back cover 19. The back cover opening-closing lever 28 as shown in that figure is mounted on the back cover 19 by stepped fastener screws 53 and 54 screwed into respective screw threaded holes in the inner surface of the back cover 19. The stepped fastener screws 53 and 54 are relatively slidably inserted into slots 28b and 28c of the back cover opening-closing lever 28 so that the back cover opening-closing lever 28 can move in the longitudinal direction, while being supported by the stepped fastener screws 53 and 54.

A spring 55 urges &he back cover opening-closing lever 28 to the left as viewed in FIG. 4. A latch pin 1f is fixedly mounted on the framework 1.

In the state where the back cover 19 is closed, a hooked portion 28a of the back cover opening-closing lever 28 engages the latch pin 1f as shown in FIG. 4, so that the lever 28 is locked on the latch pin 1f. When opening the back cover 19, the photographer slides the back cover opening-closing operation knob 27 to the right, so that the hooked portion 28a is released from the locking connection with the latch pin 1f. Hence, the photographer can open the back cover 19.

FIG. 5 shows the driving power transmission mechanism for driving the feeding roller 2, the spool 8 and the fork, the electric motor 9 for supplying a driving power to the driving power transmission mechanism, and the parts associated with the sprocket 30.

In FIG. 5, the mechanism includes a spool gear 8a formed integrally with the spool 8, a pinion 34 fixed to the output shaft of the motor 9, a sun gear 38, a planet lever 39 rotatable about a common shaft 40 of the sun gear 38, a planet gear 41 rotatably supported on the free end of the planet lever 39 and always meshing with the sun gear 38, a speed reduction gear train of gears 35-37 each having two gear elements of small and large sizes formed as a unit, a windup gear train of gears 42-44 for transmitting the driving power to the spool 8, a rewind gear train of gears 46-49 for transmitting the driving power to a folk gear 50, and a fork 51 arranged to enter the hub of the cartridge P.

The planet gear 41 is mounted on the planet lever 39 with a prescribed frictional force therebetween. When the load overcomes the frictional force, the planet gear 41 is caused to rotate. Also between the planet lever 39 and the shaft 40 there is a prescribed frictional force. When the load overcomes this frictional force, the shaft 40 only rotates, leaving the planet lever 39 stationary.

The gear 43 has a collar 43a on one face thereof. Formed in this collar 43a is a cutout 43b. An upper half of a shaft of the gear 44 is inserted into the collar 43a. A coil spring 45 is fitted on the lower half of the shaft. One end 45a of the coil spring 45 engages in the cutout 43b. Therefore, rotation of the gear 43 after having been transferred to the coil spring 45 through the one end 45a thereof is directed therefrom to the gear 44. Because of this, if a difference in the speed of rotation between the gears 43 and 44 arises, the spring 45 is distorted to absorb the rotation speed difference of both gears.

A pulley 42a is fixedly mounted on the gear 42. An endless belt (toothed belt) 52 is trained between the pulley 42a and another pulley 33 which is fixedly mounted on the shaft 2a so that the film feeding roller 2 is rotated in unison.

A disc 56 is fixedly secured to the sprocket 30 through a shaft 57. An electrically conductive pattern 56a for detecting rotation is formed on the disc 56. A switch 58 for detecting the amount of fed film is arranged adjacent the disc 56 and has two contact members 58a and 58b to come into contact with the electrically conductive pattern 56a. This detection switch 58 is electrically connected to a control circuit for the camera of this embodiment shown in FIG. 6.

Figure 6:
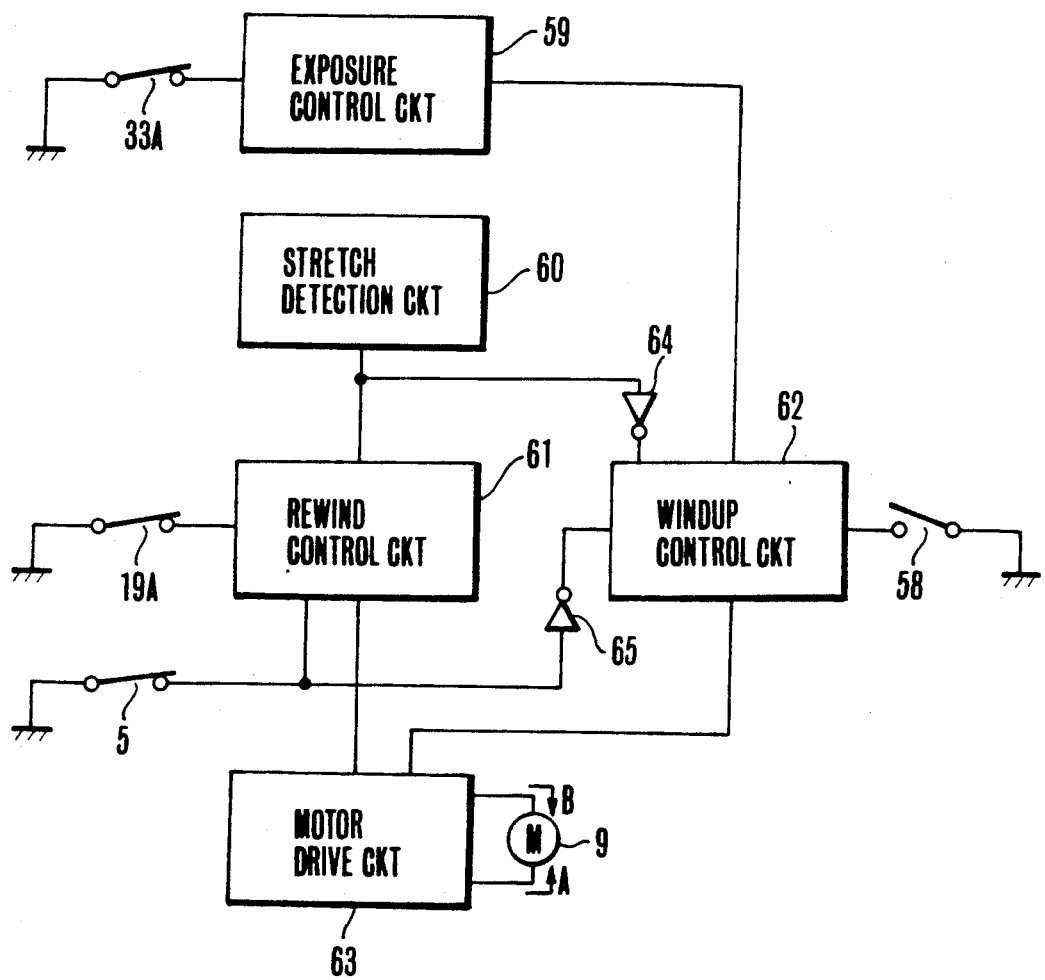
FIG. 6 is a schematic diagram of a control circuit installed in the camera of FIG. 1.

In FIG. 6, reference numeral 5 identifies the above-described switch for detecting whether or not the film is present in the blank rewind film passage slit 18, and for detecting when the film leader end has moved away therefrom. The circuit of FIG. 6 further includes a switch 19A arranged to turn off when the back cover 19 is closed, a switch 33A arranged to turn off when the release button 33 is pushed down, an exposure control circuit 59, a stretch detection circuit 60 for detecting when the film is stretched between the cartridge and the spool as the film has been exposed to the last frame, a rewind control circuit 61, a windup control circuit 62, inverters 64 and 65 for producing output signals of the polarity opposite to that of the input signals, a motor drive circuit 63 comprising the known transistor bridge circuit for controlling current supply to the motor 9, and a switch 58 responsive to rotation of the above-described sprocket 30 for producing a train of pulses. The rewind and windup control circuits 61 and 62 are actuated when an input signal of high or "H" level enters them, and are rendered inoperative when another input signal of low or "L" level is given.

Also, the stretch detection circuit 60 produces an output signal of "H" level when the film is stretched.

The operation of the camera of this embodiment having the above-described constructional features in the loading-followed-by-shooting mode, and how each of the portions of the camera works are next described by reference to FIGS. 1 to 6.

Before the camera is loaded with film, the photographer will open the back cover 19, so that the switches 5, 19A and 33A each are turned on to set both the rewind control circuit 61 and the windup control circuit 62 in the inoperative state. Because both circuits do not give any control signals to the motor drive circuit 63, the motor 9 is stopping.

During the loading operation, the back cover 19 is opened, then a film cartridge P is inserted into the cartridge chamber 1a, and, while the film leader F projecting outwardly of the cartridge P is left extending outside the camera, the back cover 19 is then closed. As the back cover 19 has moved to the terminal end, the hooked portion 28a of the back cover 19 engages the latch pin 1f. Thus, the back cover 19 is locked. At the time when the back cover 19 is closed, the switch 19A is opened to produce an output signal of "H" level which is applied to the rewind control circuit 61.

Meanwhile, since the film is present in the blank rewind film passage slit 18, because the film leader portion F intervenes between the two contacts of the switch 5, the switch 5 also remains off. Even from the switch 5, therefore, its output signal of "H" level also is applied to the rewind control circuit 61.

When the two signals of "H" level from the switches 5 and 19A occur simultaneously, the rewind control circuit 61 starts to operate, producing an actuating signal for the motor drive circuit 63. Hence, the motor drive circuit 63 supplies current of a direction indicated by an arrow A to the motor 9. Thus, the motor 9 is rotated in the rewinding (reverse) direction.

The rewinding rotation of the motor 9 is transmitted through the gears 35-37 to rotate the sun gear 38 in a counterclockwise direction as viewed in FIG. 5. Therefore, the planet lever 39 is caused to turn about the shaft 40 in the counterclockwise direction, so that the planet gear 41 is brought into engagement with the gear 46. When the planet gear 41 engages the gear 46, since the load on the gear 46 exceeds the frictional torque between the planet lever 39 and the planet gear 41, the planet gear 41 starts to rotate. Thus, the rotation of the motor 9 is transmit&ed to the gear 46 through the sun gear 38 and planet gear 41, and therefrom further propagated through the gears 46-49 to the fork gear 50. Then, the fork 51 in mesh with the fork gear 50 is shifted downward, entering into the hub of the cartridge. Upon establishment of the drive connection therebetween, the supply spool in the cartridge is also rotated by the rotating fork 51. Therefore, the film is being rewound into the cartridge, and the film present in the film passage slit 18 with the film leader left outside the camera is pulled into the camera. It should be noted in this connection that because the gear 42 is out of mesh with the planet gear 41, the driving power of the motor 9 is not transmitted to the gear 42.

As the pulling-in of the film leader F exposed to the outside of the camera goes on, when the end of the film leader F moves away from the contacts of the switch 5, electrical connection is established therebetween. The output signal of "L" level from the thus-closed switch 5 is applied to the rewind control circuit 61 and the inverter 65. The output signal of "H" level from the inverter 65 is then applied to the windup control circuit 62. Thus, the signal from the rewind control circuit 61 is stopped from further being applied to the motor drive circuit 63. As a result, the current supply from the motor drive circuit 63 to the motor 9 is cut off and the motor 9 stops.

Meanwhile, since the output signal of "H" level from the inverter 65 is applied to the windup control circuit 62, because the windup control circuit 62 is rendered operative, the stoppage of rotation of the motor 9 is then followed by application of the motor drive signal from the windup control circuit 62 to the motor drive circuit 63. Responsive to this, the motor drive circuit 63 supplies current of the opposite direction indicated by arrow B in FIG. 6 to the motor 9. As a result, the motor 9 starts to rotate in the winding-up (normal) direction.

When the motor 9 rotates in the normal direction, the sun gear 38 is rotated in the clockwise direction as viewed in FIG. 5 through the gears 35-37. Therefore, at first, the planet lever 39 is turned about the shaft 40 in the clockwise direction to take the planet gear 41 out of engagement with the gear 46 and then to bring it into engagement with the gear 42. Then, the planet gear 41 is rotated by the sun gear 38, and the gear 42 is also rotated by the gear 41 in the clockwise direction as viewed in FIG. 5. When the gear 42 rotates, the pulley 42a in unison therewith is also rotated in the clockwise direction. Through the endless belt 52, the pulley 33 too is rotated in the clockwise direction. Therefore, the film feeding roller 2 is rotated in the clockwise direction as viewed in FIGS. 1 and 5. Thus, the film leader F while being sandwiched between that roller 2 and the first pinch roller 23 is advanced from the right to the left as viewed in FIG. 1. As a result, the tip of the film leader F is caused to enter between the glass plate 7 and the pressor plate 16, and then traveled through the thus-formed film advance path between the pressor plate 16 and the glass plate 17 toward the spool chamber 1b. When the film leader F moves past the center of the aperture, the teeth of the sprocket 30 come to engage in the perforations of the film. Thus, drive connection between the film and the sprocket 30 is established. From this time onward, the sprocket 30 is rotated by the film as the latter advances toward the spool chamber 1b. When the sprocket 30 is rotated by the moving film, the electrically conductive pattern 56a on the disc 56 also rotates. Therefore, the switch 58 whose contacts 58a and 58b ride on the pattern 56a produces an electrical signal in the form of a corresponding number of pulses to the distance the film has advanced. These pulses are applied to the windup control circuit 62 where the length of one frame is determined and the number of exposed frames is memorized.

It should be noted that because the gear 42 is rotating, the gear 43 is also rotated, and the coil spring 45 also is rotated through the collar 43a and the spring end 45a. Thus, rotation is transmitted even to the gear 44 in connection with the coil spring 45. Therefore, the spool gear 8a in mesh with the gear 44, too, is rotated, and the spool 8 in unison with the spool gear 8a is rotated in the clockwise direction as viewed in FIGS. 1 and 3.

As the film is being fed, the film leader tip enters the spool chamber 1b where it is guided by the roller support plate 13 in FIG. 1 to the outer periphery of the spool 8, and eventually caught by the film leader connecting roller 14 pressed on the outer periphery of the spool 8. After that, the film leader is tightly wound onto the spool 8. When the amount of wound film on the spool 8 reaches a predetermined value, the fed film amount detecting switch 58 produces an output signal. Having detected the occurrence of this signal, the windup control circuit 62 then stops production of the actuating signal for the motor drive circuit 63. As a result, the motor drive circuit 63 no longer supplies the current of the direction of arrow B to the motor 9. Thus, the motor 9 is stopped from further rotation. This implies that the operation of connecting the film leader to the spool 8 is complete and the film loading operation terminates.

To shoot a frame, the photographer pushes the release button 33, so that the switch 33A is opened to render operative the exposure control circuit 59. A diaphragm mechanism and a shutter mechanism (both not shown) are then operated in sequence to make an exposure. When the shooting of one frame is completed (or when the exposure has been completed), the exposure control circuit 59 produces an output signal representing the termination of the exposure operation which is applied to the windup control circuit 62. Responsive to this signal, the windup control circuit 62 produces a motor drive signal which is applied to the motor drive circuit 63. The motor drive circuit 63 then supplies current of the direction of arrow B to the motor 9. Thus, the motor 9 is rotated in the winding direction.

When the motor 9 rotates in the winding direction, the feeding roller 2 is driven to rotate by virtue of the mechanism of FIG. 5, and the film is moved in the direction from the cartridge chamber 1a to the spool chamber 1b. During this time, the sprocket 30 is rotated by the film so that the switch 58 produces a pulse signal representing the amount of moved film. This pulse signal is counted by a counter in the windup control circuit 62. When the counted value has coincided with a predetermined value for one film frame, the motor drive signal which has been applied from the windup control circuit 62 to the motor drive circuit 63 is cut off. Therefore, when the film has been advanced one frame, the motor 9 is stopped.

As such a procedure repeats itself until all frames are exposed, when no more fresh area of the film can be pulled out of the cartridge, the stretch detection circuit 60 produces a control signal of "H" level which is applied to the rewind control circuit 61 and the inverter 64. Responsive to this, the inverter 64 produces an output of "L" level which is applied to the windup control circuit 62. Thus, the windup control circuit is rendered and held inoperative.

Meanwhile, responsive to the signal of "H" level from the stretch detection circuit 60, the rewind control circuit 61 applies a motor drive signal to the motor drive circuit 63. Then, the motor drive circuit 63 supplies current of the direction of arrow A to the motor 9. Therefore, the motor 9 is rotated in the rewinding direction. By virtue of the mechanism of FIG. 5, the fork 51 is inserted into the hub of the cartridge P and then the supply spool in the cartridge is rotated to rewind the film, thus initiating a film rewinding operation. At the termination of the rewinding operation, the rewind control circuit 61 no longer produces the motor drive signal. Responsive to this, the motor drive circuit 63 stops the motor 9.

Though the foregoing embodiment has been described in connection with the ordinary film transportation method (in more detail, after the cartridge is loaded, the film is wound up one frame by one frame from the inside of the cartridge to make exposures, and, after all the frames have been exposed, they are returned from the take-up spool to the cartridge), it is to be understood that the present invention can be applied to the camera employing the so-called "pre-winding" method (that is, the loading of the cartridge is followed by winding up all film in the cartridge on the takeup spool, and then the film is advanced one frame by one frame in a direction from the take-up spool to the supply spool in the cartridge as each frame has been exposed).

Next described is another embodiment of the invention which is different from the foregoing embodiment in that the cartridge chamber is so disposed that the film advance path at the outer periphery of the film feeding roller serving as the film feeding action portion is made to be bent at an almost right angle. The other parts and their behaviors are similar to those in the above-described embodiment. Hence what corresponds to FIG. 1 of the foregoing embodiment is only illustrated in FIG. 7, while the other corresponding figures are omitted as they are similar to those of the foregoing embodiment.

FIG. 7 in transverse sectional plan view shows the constructional feature of the second embodiment of the invention, wherein the same reference characters have been employed to denote the similar parts to those shown in FIG. 1.

In FIG. 7, in a framework 1' of the camera, the spool chamber 1b is formed along with part of the partition side wall of a cartridge chamber 1a'. Formed in a front cover 3' is a curved portion 3a' forming another part of the partition side wall of the cartridge chamber 1a'. A back cover 19' is hinged on a pin 20' provided in the end portion of the curved portion 3a'. The entrance of the cartridge chamber 1a' is oriented to one lateral side of the camera. The back cover 19' for closing the entrance of the cartridge chamber 1a' appears being curved and extending from the hinge at the front side of the camera across the entire lateral side to the rear side. The cartridge chamber 1a' is arranged closer to the aperture (the center of the camera) than in the prior-known camera. Furthermore, the cartridge chamber 1a' has its entrance facing the side face of the camera and is disposed extruding toward the front of the camera relative to the spool chamber 1b. In this embodiment of the camera, therefore, &he distance H from the optical axis of the photographic lens 29 to the right hand side surface of the cartridge chamber 1a' becomes shorter than that of the previously proposed camera. This leads to a possibility of preventing the breadth of the camera from increasing.

In the rear of the cartridge chamber 1a', there is positioned the film feeding roller 2 serving as the film feeding action portion. For this purpose, the camera framework 1' is formed as receding inside to provide a space the film feeding roller 2 occupies. The roller 2 is fixedly mounted on a rotary shaft 2a.

In this embodiment of the camera, the film from the mouth of the cartridge P in the cartridge chamber 1a' first goes right backward, then changes its direction to almost a right angle around the outer periphery of the film feeding roller 2 and then is directed to the aperture in parallel with the rear plane of the camera. This results in an increase of the length of contact of the film with the roller 2. Hence, a larger driving power can be given to the film.

As has been described above, according to the invention, the camera has its cartridge chamber located more toward the front of the corners than the spool chamber and close to the aperture chamber and the entrance to the cartridge chamber is made open toward the side of the camera, while a film feeding action portion is made arranged in rear of the cartridge chamber to turn the film advance path from the cartridge chamber to the aperture around the outer periphery of the film feeding action portion, thereby giving advantages that the breadth of the camera can be prevented from increasing, and an increase of the driving power of the film can be achieved. Thus, slippage between the film feeding action portion and the film can be prevented.

Also, the front cover is constructed in such a form as to constitute the front side wall of the cartridge chamber. Therefore, the casing of the cartridge chamber can be used as a grip. As a result, the steadiness of holding the camera by hand can be improved.

Though the illustrated embodiments of the invention have been described as applied to the simplified loading type of the small back cover-equipped camera, it is apparent that the invention is applicable to any other types of cameras.

What is claimed is:

1. A camera in which a film cartridge is loaded into the camera while a leader of film projecting out of the film cartridge initially remains outside the camera, and after the leader of film projecting out of the film cartridge is pulled into the camera, the film is fed to a film take-up spool, said camera comprising:
   (a) a film cartridge chamber arranged such that a film advance path is bent at a position between said film cartridge chamber and an aperture of the camera;
   (b) a film feeding roller which contacts the film and feeds the same by a friction force caused thereby, said roller being positioned at said bent portion such that the film partially surrounds said film feeding roller so as to increase the contact area between the film and said film feeding roller; and
   (c) driving power means for applying driving power to said film feeding roller to feed the film.

2. A camera according to claim 1, wherein said film cartridge chamber is arranged to protrude toward the front of the camera such that the film advance path is bent at the position between said film cartridge chamber and the aperture of the camera.

3. A camera according to claim 2, wherein a grip portion is formed in the front surface of the camera along said film cartridge chamber.

4. A camera according to claim 3, wherein said film advance path is arranged to be bent approximately 90° in the position of said film feeding roller.

5. A camera according to claim 1, wherein said film advance path is arranged to be bent approximately 90° in the position of said film feeding roller.

6. A camera, comprising
   (a) a film cartridge chamber arranged such that a film advance path is bent at a position between said film cartridge chamber and an aperture of the camera;
   (b) a film feeding roller which contacts the film and feeds the same by a friction force caused thereby, said roller being positioned at said bent portion such that the film partially surrounds said film feeding roller so as to increase the contact area between the film and said film feeding roller; and (c) driving power means for applying driving power to said film feeding roller to feed the film.

7. A camera according to claim 6, wherein said film cartridge chamber is arranged to protrude toward the front of the camera such that the film advance path is just at the position between said film cartridge chamber and the aperture of the camera.

8. A camera according to claim 7, wherein a grip portion is formed in the front surface of the camera along said film cartridge chamber.

9. A camera according to claim 8, wherein said film advance path is arranged to be bent approximately 90° in the position of said film feeding roller.

10. A camera according to claim 6, wherein said film advance path is arranged to be bent approximately 90° in the position of said film feeding roller.

11. A film feeding device for a camera, comprising:
(a) a film cartridge chamber arranged such that a film advance path is bent at a position between said film cartridge chamber and an aperture of the camera;
(b) a film feeding roller which contacts the film and feeds the same by a friction force caused thereby, said roller being positioned at said bent portion such that the film partially surrounds said film feeding roller so as to increase the contact area between the film and said film feeding roller; and
(c) driving power means for applying driving power to said film feeding roller to feed the film.

12. A camera according to claim 11, wherein said film cartridge chamber is arranged to protrude toward the front of the camera such that the film advance path is bent at the position between said film cartridge chamber and the aperture of the camera.

13. A camera according to claim 12, wherein a grip portion is formed in the front surface of the camera along said film cartridge chamber.

14. A camera according to claim 13, wherein said film advance path is arranged to be bent approximately 90° in the position of said film feeding roller.

15. A camera according to claim 11, wherein said film advance path is arranged to be bent approximately 90° in the position of said film feeding roller.

* * * * *

UNITED STATES PATENT AND TRADEMARK OFFICE
CERTIFICATE OF CORRECTION

PATENT NO. : 5,075,707

DATED : December 24, 1991

INVENTOR(S) : Yoshinobu Shibayama, et al.

It is certified that error appears in the above-identified patent and that said Letters Patent is hereby corrected as shown below:

Title page:

AT ITEM [56]:

Under "Primary Examiner - Michael L. Gellner" insert --Attorney, Agent or Firm - Fitzpatrick, Cella, Harper & Scinto--.

FOREIGN PATENT DOCUMENTS, "55-143550 11/1950 Japan.", should read --55-143550 11/1980 Japan.--

COLUMN 1:

Line 14, "left" should be deleted.
Line 31, "have" should read --has--.

COLUMN 4:

Line 8, "pressor" should read --presser--.
Line 32, "pressor" should read --presser--.
Line 36, "pressor" should read --presser--.
Line 59, "&he" should read --the--.

COLUMN 5:

Line 19, "folk" should read --fork--.

UNITED STATES PATENT AND TRADEMARK OFFICE
CERTIFICATE OF CORRECTION

PATENT NO. : 5,075,707
DATED : December 24, 1991
INVENTOR(S) : Yoshinobu Shibayama, et al.

It is certified that error appears in the above-identified patent and that said Letters Patent is hereby corrected as shown below:

COLUMN 6:

Line 55, "transmit&ed" should read --transmitted--.
   Line 20, "is stopping." should read --stops.--.

COLUMN 7:

Line 43, "pressor" should read --presser--; and "traveled" should read --travel--.

Line 44, "pressor" should read --presser--.

COLUMN 9:

Line 52, "&he" should read --the--.

COLUMN 10:

Line 10, "made" should be deleted.

Signed and Sealed this

Fifteenth Day of June, 1993

Attest:

MICHAEL K. KIRK

Attesting Officer    Acting Commissioner of Patents and Trademarks